(12) United States Patent
Mason

(10) Patent No.: US 12,096,760 B2
(45) Date of Patent: Sep. 24, 2024

(54) TRAP RELEASE APPARATUS AND METHOD OF USE

(71) Applicant: Reese A. Mason, Malad, ID (US)

(72) Inventor: Reese A. Mason, Malad, ID (US)

( * ) Notice: Subject to any disclaimer, the term of this patent is extended or adjusted under 35 U.S.C. 154(b) by 103 days.

(21) Appl. No.: 18/115,494

(22) Filed: Feb. 28, 2023

(65) Prior Publication Data
US 2023/0345929 A1 Nov. 2, 2023

Related U.S. Application Data

(60) Provisional application No. 63/335,372, filed on Apr. 27, 2022.

(51) Int. Cl.
*A01M 23/28* (2006.01)
*B25J 1/04* (2006.01)

(52) U.S. Cl.
CPC ............. *A01M 23/28* (2013.01); *B25J 1/04* (2013.01)

(58) Field of Classification Search
CPC ............ A01M 23/28; B25J 1/02; B25J 1/04
See application file for complete search history.

(56) References Cited

U.S. PATENT DOCUMENTS

| | | | | | |
|---|---|---|---|---|---|
| 914,307 | A * | 3/1909 | Rhoades | ............... | B66C 1/48 294/104 |
| 1,718,398 | A * | 6/1929 | Zaeske | ............... | B25B 7/18 294/104 |
| 2,575,638 | A * | 11/1951 | Price | ............... | A01D 11/00 294/50.9 |
| 2,770,483 | A * | 11/1956 | Patnaude | ............... | A01B 1/18 294/50.9 |
| 3,990,146 | A * | 11/1976 | Asselta | ............... | A01B 1/18 7/114 |
| 4,547,010 | A * | 10/1985 | Camp | ............... | A01B 1/18 294/50.9 |
| 5,941,586 | A * | 8/1999 | Fann | ............... | E04H 4/1609 294/111 |
| 6,139,077 | A * | 10/2000 | Molzan, II | ............... | E04D 13/0765 294/111 |
| 6,685,246 | B1 * | 2/2004 | Rose | ............... | B25J 1/02 294/50.9 |
| 2015/0151429 | A1 * | 6/2015 | Thibodeaux | ............... | E01H 1/12 294/104 |
| 2015/0217442 | A1 * | 8/2015 | Alexander | ............... | B25J 1/04 29/453 |
| 2019/0248022 | A1 * | 8/2019 | Sapienza | ............... | B25J 1/04 |
| 2022/0241957 | A1 * | 8/2022 | Li | ............... | B25J 1/04 |
| 2023/0191587 | A1 * | 6/2023 | Loreto | ............... | B25J 1/04 294/19.3 |

FOREIGN PATENT DOCUMENTS

GB 2598149 A * 2/2022 ............ A01M 23/24

* cited by examiner

*Primary Examiner* — Michael H Wang

(57) ABSTRACT

A trap apparatus includes a first shaft and a second shaft removably attachable to each other, a third shaft hingedly coupled to the first shaft, and a head assembly coupled to the second shaft. The third shaft may be coupled to and interact with the head assembly via a cable. Accordingly, when the third shaft is actuated, the head assembly moves to a first or a second position in order to open a foothold trap and release a non-targeted animal.

20 Claims, 17 Drawing Sheets

TRAP RELEASE APPARATUS AND METHOD OF USE

CROSS-REFERENCE TO RELATED APPLICATIONS

This application claims the benefit of U.S. Provisional Application Ser. No. 63/335,372, filed on Apr. 27, 2022, which is incorporated herein by reference.

TECHNICAL FIELD

The present disclosure relates to a trap release. More particularly, the present disclosure relates to a trap release apparatus that is capable of opening the jaws of a foothold trap from a distance.

BACKGROUND

Trapping animals has been an essential part of the world's history since the first humans walked the earth. Trapping has provided humans not only the opportunity to provide food for their families, but it has also allowed many to create clothing to stay warm and others to make money or obtain goods, through selling fur or bartering fur for other goods. There are many approaches to trapping animals and many types of traps to accomplish the task. For example, the various traps used throughout history included snares, nets, body traps, and foothold traps.

Foothold traps are prevalent today and used by many outdoor enthusiasts and government trappers. They work by utilizing one or more springs with jaws. Once the jaws are secured in an open position, they do not close until pressure is placed on the trap's pan. Accordingly, after an animal steps onto the trap's pan, the closed jaws hold the animal's foot, thereby preventing its escape. While the majority of trappers across the United States are trained via trapper classes before setting traps; however, at times, some non-targeted animals may be caught in their traps. For example, mountain lions, dogs, or another non-targeted animal may be caught unintentionally. When this occurs, it can be an extremely difficult process to release the non-targeted animal.

A majority of fish and wildlife offices, USDA government trappers, animal control businesses, sportsman, and others around the United States release non-targeted animals by placing a loop of a catch/choke pole around the animal's neck and leg, allowing the wildlife officer to attempt to hold down the animal while another opens the jaws of the trap to release the animal. It can become dangerous as the animal can attack the individual holding the catch pole and/or the individual releasing the trap due to the fact that this individual is in close proximity to the animal. Furthermore, damage may also be caused to the non-targeted animal because of the effects of the catch pole around its neck. Not only is it dangerous to the user and animal, but using a catch/choke pole requires numerous people, which may lead to too many people in a dangerous situation and it may be time consuming to wait for additional helpers to arrive.

Accordingly, there is a need for an apparatus that allows a single user to release an animal from a foothold trap while keeping the user and animal safe. The present invention seeks to solve these and other problems.

SUMMARY OF EXAMPLE EMBODIMENTS

In one embodiment, a trap apparatus comprises a first shaft and a second shaft removably attachable to each other, a third shaft hingedly coupled to the first shaft, and a head assembly coupled to the second shaft. The third shaft may be coupled to and interact with the head assembly via a cable. Accordingly, when the third shaft is actuated, the head assembly moves to a first or a second position in order to open a foothold trap and release a non-targeted animal.

In one embodiment, a method of using the trap release apparatus comprises actuating the head assembly via the third shaft (e.g., lifting up on the third shaft) to move the trap release apparatus to a first position (e.g., head assembly with first and second arms in an extended position away from the trap panel); placing the trap panel against the bottom of a trap with the first and second arms over the springs of the trap, while the trap is in a closed position; actuating the third shaft (e.g., moving it to a position where it is parallel with the first shaft) so as to move the head assembly to a second position (e.g., head assembly with the first and second arms in a retracted position, moved towards the trap panel), thereby depressing the springs of the trap and moving the trap to an open position, releasing the non-targeted animal.

DETAILED DESCRIPTION OF EXAMPLE EMBODIMENTS

Figure 1:
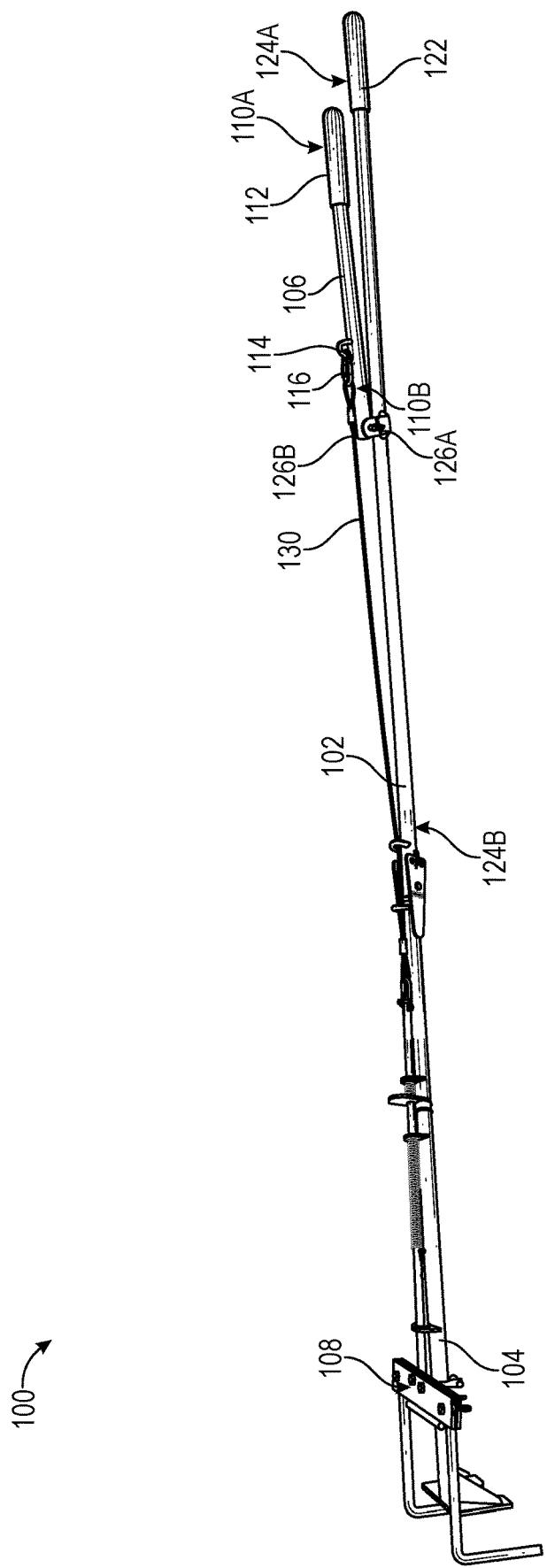
FIG. 1 illustrates a side perspective view of a trap release apparatus.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed.

Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for an apparatus that allows a single user to release an animal from a foothold trap while keeping the user and animal safe. The present invention seeks to solve these and other problems.

There are many approaches to trapping animals and many types of traps to accomplish the task. Foothold traps are prevalent today and used by many outdoor enthusiasts and government trappers. They work by utilizing one or more springs with jaws. After an animal steps in the trap, the jaws close to secure an animal. When this occurs, it can be an extremely difficult to release the animal, if it is necessary. Many are left to use a choke pole to subdue the non-targeted animal. In addition, if the choke pole is ineffective, fish and wildlife offices may turn to tranquilizers to prevent harm to the non-targeted animal. With either situation, there are inherent consequences, such as damage to the animal, danger to the individuals releasing the animal, and costs due to the techniques used and the numerous people required.

The trap release apparatus described herein comprises a first shaft, a second shaft coupleable to the first shaft, and a third shaft hingedly coupled to the first shaft. The third shaft is coupled to a head assembly and is actuated via the third shaft. Typically, a user is limited to opening a foothold trap with their hands, which increases risk to the user. Accordingly, the trap release apparatus may be a variety of lengths to place the user at a safer distance when releasing an animal from a trap.

To use the trap release apparatus, a user would place the head assembly with a first arm and a second arm on the one or more springs of a foothold trap (e.g., long spring or coil spring). The user would then actuate the third shaft, thereby depressing the one or more springs and opening the jaws of the foothold at which point the non-targeted animal is released. It will be appreciated that the trap release apparatus allows a user to be more protected from the non-targeted animal and allows a user to release the non-targeted animal without others.

As shown in FIGS. 1, in one embodiment, a trap apparatus 100 comprises a first shaft 102 and a second shaft 104 removably attachable to each other, a third shaft 106 hingedly coupled to the first shaft 102, and a head assembly 108 coupled to the second shaft 104. While the trap apparatus 100 is shown having two shafts that couple together, it will be understood that in some embodiments, the trap apparatus 100 may comprise a single shaft or more than two shafts coupleable together to create a desired length. In some embodiments, the first and second shafts 102, 104 may be telescoping and may include additional shafts. The first, second, and third shafts 102-106 may be manufactured from steel, aluminum, carbon fiber, or any other type of material known in the art. It will be appreciated that the different shafts 102, 104, 106 may each be of a different material than the other or the same material. For example, the third shaft 106 may be manufactured from aluminum, while the first and second shafts 102, 104 are manufactured from steel. Further, the first, second, and third shafts 102, 104, 106 may be cylindrical, square-shaped, etc. The first, second, and third shafts 102, 104, 106 may vary in thickness and diameter so as to function with different sizes and spring strengths of footholds.

Figure 2:
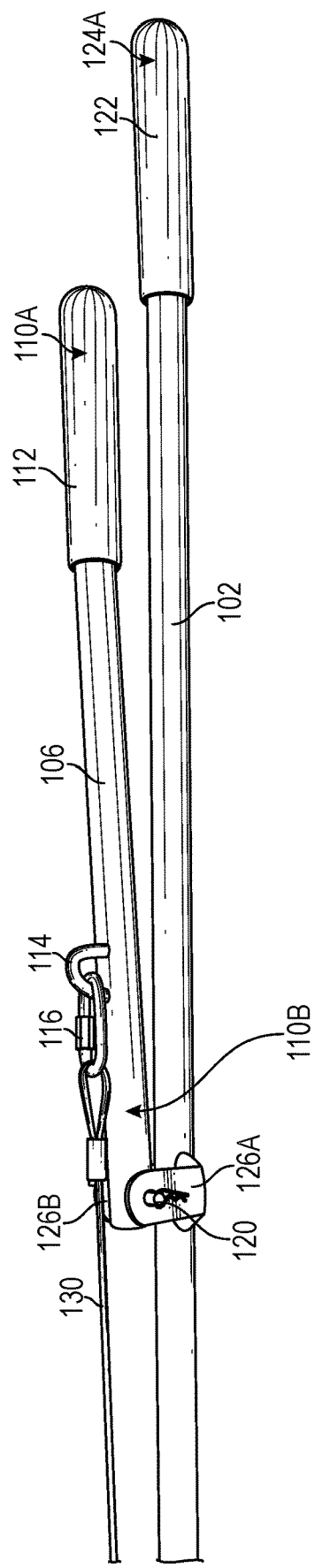
FIG. 2 illustrates a top perspective view of a first and third shaft of a trap release apparatus.
Figure 3:
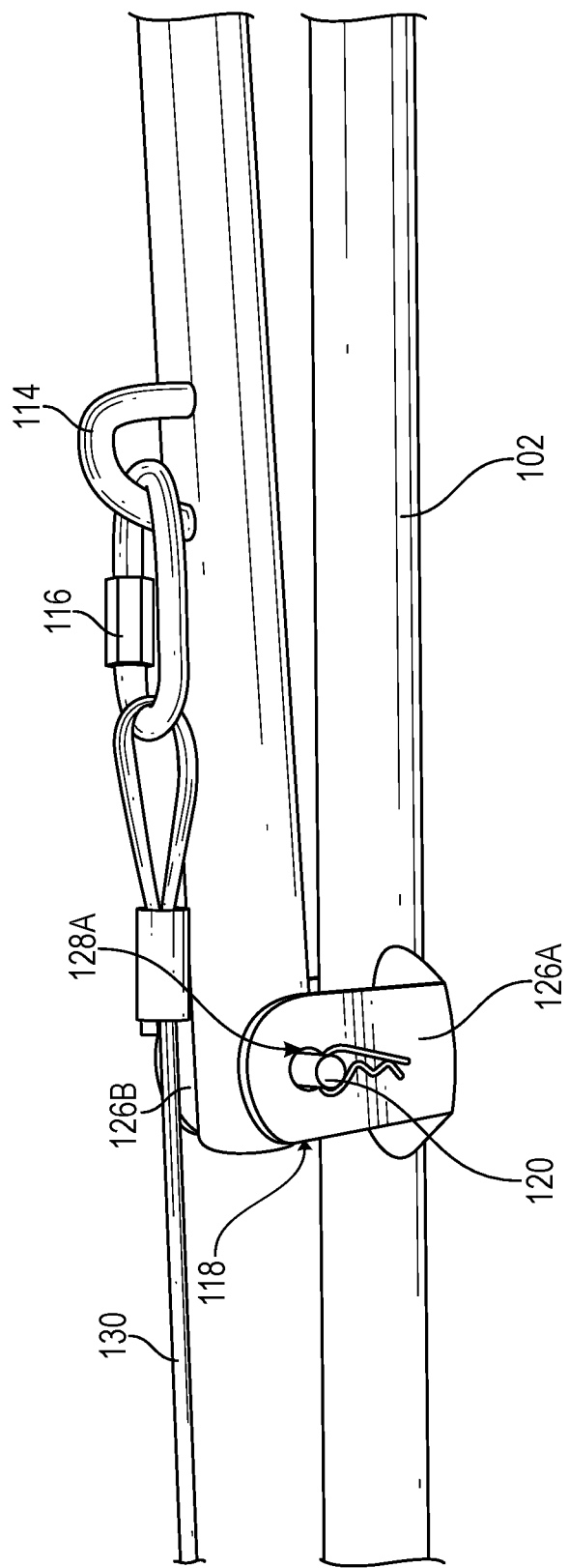
FIG. 3 illustrates a side perspective view of a first and third shaft of a trap release apparatus.

As shown in FIGS. 2-3, the third shaft 106 may comprise a first end 110A and a second end 110B. The first end 110A may comprise a third shaft handle 112, such as rubber encompassing the first end 110A. In some embodiments, the third shaft handle 112 may also be leather, plastic, or any other type of grip material. At the second end 110B of the third shaft 106, opposite the first end 110A, the third shaft 106 may comprise a loop 114 fastened thereto that may receive a fastener 116 (e.g., a quick link). In addition, the second end 110B may comprise a third shaft aperture 118 to receive a pin 120.

The first shaft 102 may comprise a first shaft handle 122 at a third end 124A that may be manufactured from the same material as the third shaft handle 112, or a different material. The first shaft 102 may comprise a first panel 126A with a first panel aperture 128A and a second panel 126B with a second panel aperture (same as first panel aperture) that may receive the second end 110B of the third shaft 106 and be hingedly coupled thereto. In particular, the pin 120 may be placed through the first panel aperture 128A, the third shaft aperture 118, and the second panel aperture, thereby coupling the third shaft 106 to the first shaft 102. In some embodiments, the third shaft 106 may comprise fasteners (e.g., ball nose spring plungers) that interface with the first and second panels 126A, 126B, or other panels, so as to hold the third shaft 106 down when it is pulled down to release the trap. It will be appreciated that the third shaft 106 may vary in length and mounting location, depending on the length of the first and second shafts 102, 104.

The loop 114 on the third shaft 106 may receive the loop fastener 116 (e.g., threaded quick link or shackle) and the loop fastener 116 may receive a cable 130 (e.g., a coated or non-coated wire cable or nylon). The cable 130, in some embodiments, may have loops formed at each end thereof using compression sleeves.

Figure 4:
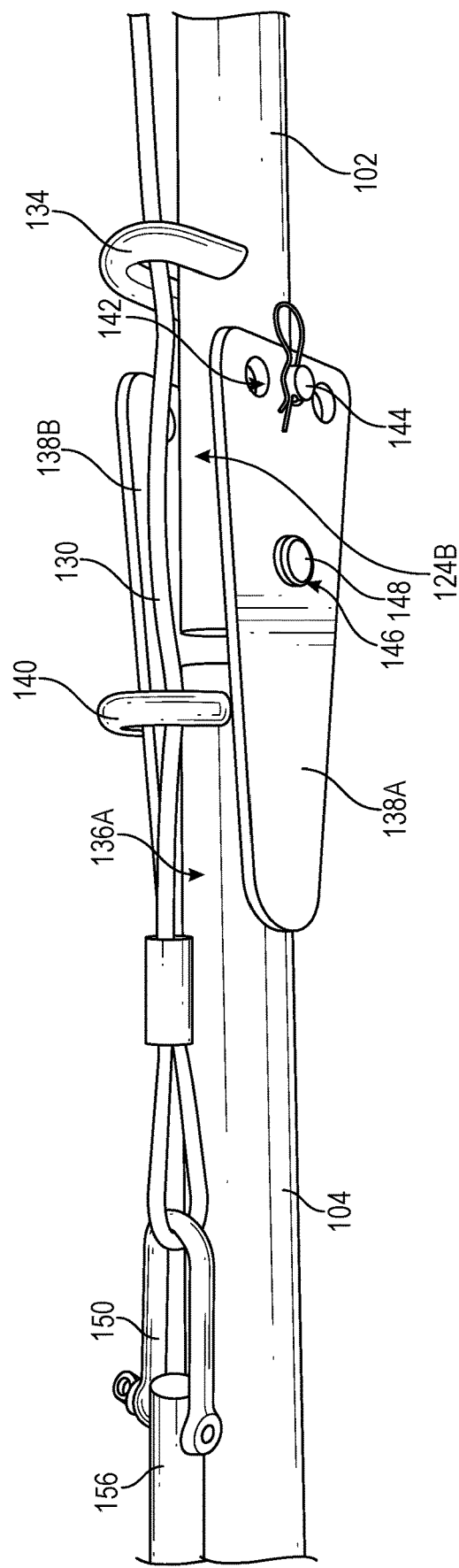
FIG. 4 illustrates a side perspective view of a first and second shaft of a trap release apparatus.

As illustrated in FIG. 4, the first shaft 102 may comprise the third end 124A (FIG. 1) that is opposite a fourth end 124B. The fourth end 124B may comprise a first aperture and a second aperture. The fourth end 124B may also comprise a first guide loop 134 (e.g., a metal loop or pulley) that contains the cable 130. The second shaft 104 may comprise a fifth end 136A and a sixth end 136B (FIG. 6), the sixth end 136B being opposite the fifth end 136A. The fifth end 136A may comprise a third panel 138A, a fourth panel 138B, and a second guide loop 140 (e.g., a metal loop or pulley). The third and fourth panels 138A, 138B may each be coupled to the fifth end 136A. The third and fourth panels 138A, 138B may, in some embodiments, be triangular shaped, with protruding ends being wider than ends coupled to the fifth end 136A. The protruding ends of the third and fourth panels 138A, 138B may each comprise at least one adjustment aperture 142. The adjustment apertures 142 may receive a second pin 144 that may be placed through any of the adjustment apertures 142 and the first aperture. The adjustment apertures 142 may allow the first shaft 102 to be coupled to the second shaft 104 at a variety of angles, thereby allowing a user to change the angle of the trap apparatus 100 to adjust to any situation to release a foothold trap, such as a trap in a hole. In addition, the third panel 138A and fourth panel 138B may each comprise a first pin aperture 146 to receive a third pin 148. Once the second and third pins 144, 148 are in position, the first and second shafts 102, 104 are secured together. Because of the second and third pins 144, 148 being capable of being removed, the first and second shafts 102, 104 may be detached so as to decrease the length of the trap apparatus 100 for traveling or for placing it in storage. In some embodiments, the length of the first, second, and third shafts 102-106 may vary depending on the need. The cable 130 may extend from the loop 114 through the first and second guide loops 134, 140 and couple to a bolt 150 (e.g., a U-Bolt or screw pin anchor).

Figure 5:
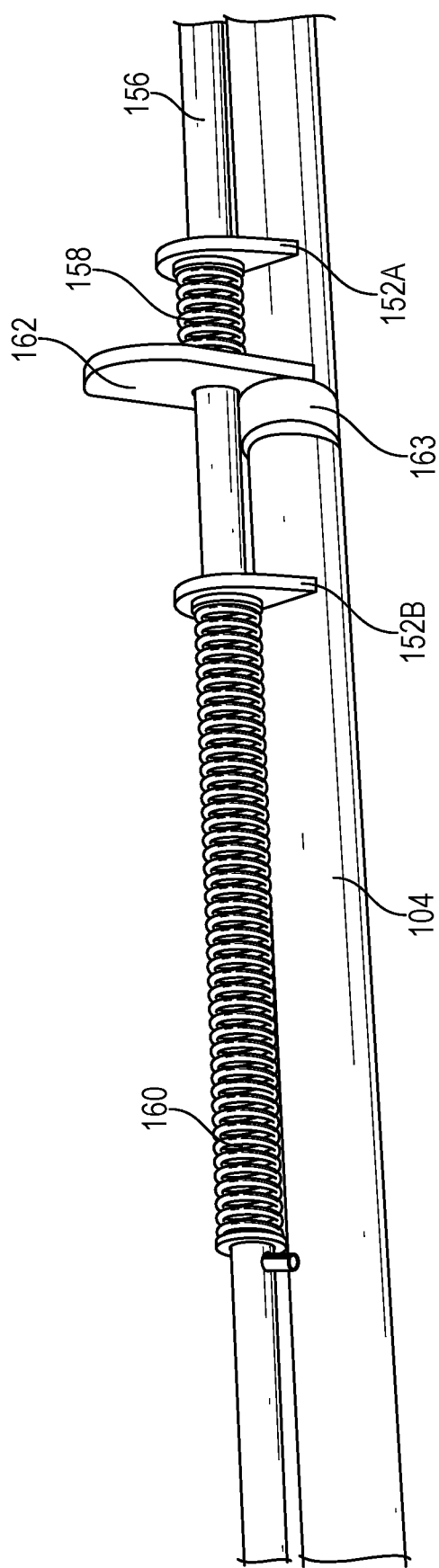
FIG. 5 illustrates a side perspective view of a second shaft of a trap release apparatus.
Figure 6:
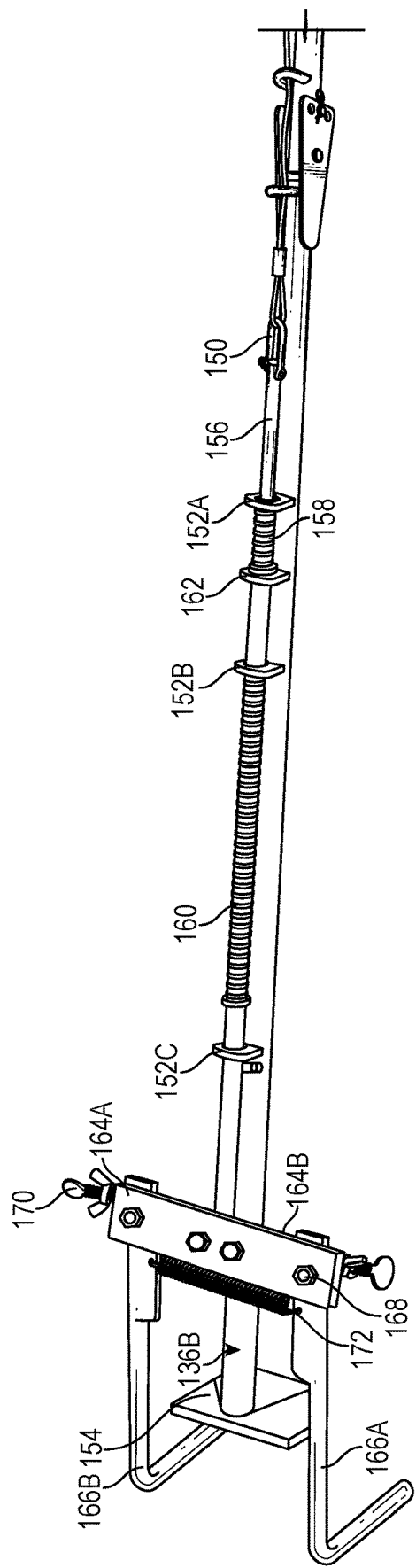
FIG. 6 illustrates a top perspective view of a head assembly of a trap release apparatus.

As shown in FIG. 5-6, the second shaft 104 may further comprise a first rod guide 152A, a second rod guide 152B, and a third rod guide 152C. The sixth end 136B may comprise a trap panel 154 that may be perpendicular to and coupled to an end of the second shaft 104 and the sixth end 136B. The bolt 150 may be coupled to a first end of a rod 156, with the rod 156 passing through the first rod guide 152A, the second rod guide 152B, and the third rod guide 152C. In some embodiments, the cable 130 may couple directly to the rod 156. In other embodiments, the trap apparatus 100 may utilize only a rod from the third shaft 106 to the head assembly 108, without the aid of the cable 130, to actuate the head assembly 108.

A first spring 158 (e.g., compression or extension spring) may be positioned on the rod 156 and be positioned between the first rod guide 152A and the second rod guide 152B. A second spring 160 (e.g., compression or extension spring) may be positioned on the rod 156 and be positioned between the second rod guide 152B and a third rod guide 152C. In addition, a release tab 162 may be coupled to the rod 156 and be positioned between the first rod guide 152A and second rod guide 152B. The release tab 162 can be moved so as to release the tension in the first and second springs 158, 160, moving the head assembly 108. The release tab 162 may be releasably secured to a tab 163 on the second shaft 104. When the springs 158 and 160 are compressed, the release tab 162 may be placed on a side of the tab 163 so as to hold the rod 156 in place. In some embodiments, a compression collar may be on one end of the spring 158, 160 that compresses the springs 158, 160 when the third shaft 106 is actuated, then returns the head assembly 108 when the third shaft 106 is released. It will be appreciated that, in some embodiments, there may be more or less rod guides than shown. In addition, in some embodiments, the positioning of the springs may be moved to different locations without departing from the apparatus 100 described herein.

Positioned on a second end of the rod 156, is a first and second arm plate 164A, 164B. The first and second arm plates 164A, 164B may be perpendicular to the second end of the rod 156. A first arm and a second arm 166A, 166B may be interposed between the first and second arm plates 164A, 164B. The first and second arms 166A, 166B may be manufactured out of steel, aluminum, or other materials. In addition, in some embodiments, the first and second arms 166A, 166B may be manufactured out of cable, rope, or any other material or mechanism capable of pulling spring levers down. The first and second arms 166A, 166B may be coupled to the first arm plate and second arm plate 164A, 164B via fasteners 168 and may be pivotally coupled to the arm plates 164A, 164B, thereby allowing the first and second arms 166A, 166B to pivot inwardly or outwardly. Each side of the first and second arm plates 164A, 164B may comprise apertures to receive adjustment fasteners 170 (e.g., receive bolts and wing nuts or any other type of securing and adjustment mechanism). The adjustment fasteners 170, when screwed toward the first and second arms 166A, 166B, may pivot the first and second arms 166A, 166B outwardly so as to adjust to different sizes of footholds. If the adjustment fasteners 170 are moved away from the first and second arms 166A, 166B, the arms may then pivot inwardly to adjust for smaller sized foothold traps. The first and second arms 166A, 166B may be coupled together via an arm spring 172 so as to allow minor adjustments of the arms when placed on a foothold trap and to keep the arms in position. In some embodiments, a single arm may be utilized to compress a spring on a foothold trap. The first and second arms 166A, 166B may extend from the first and second arm plates 164A, 164B for a first distance and then may extend downward a second distance at a 90-degree angle from the first and second arms at the first distance and the first and second arm plates 164A, 164B. While a 90-degree angle is shown for the first and second arms 166A, 166B, it will be understood the arms may be configured in numerous shapes and angles.

Figure 7:
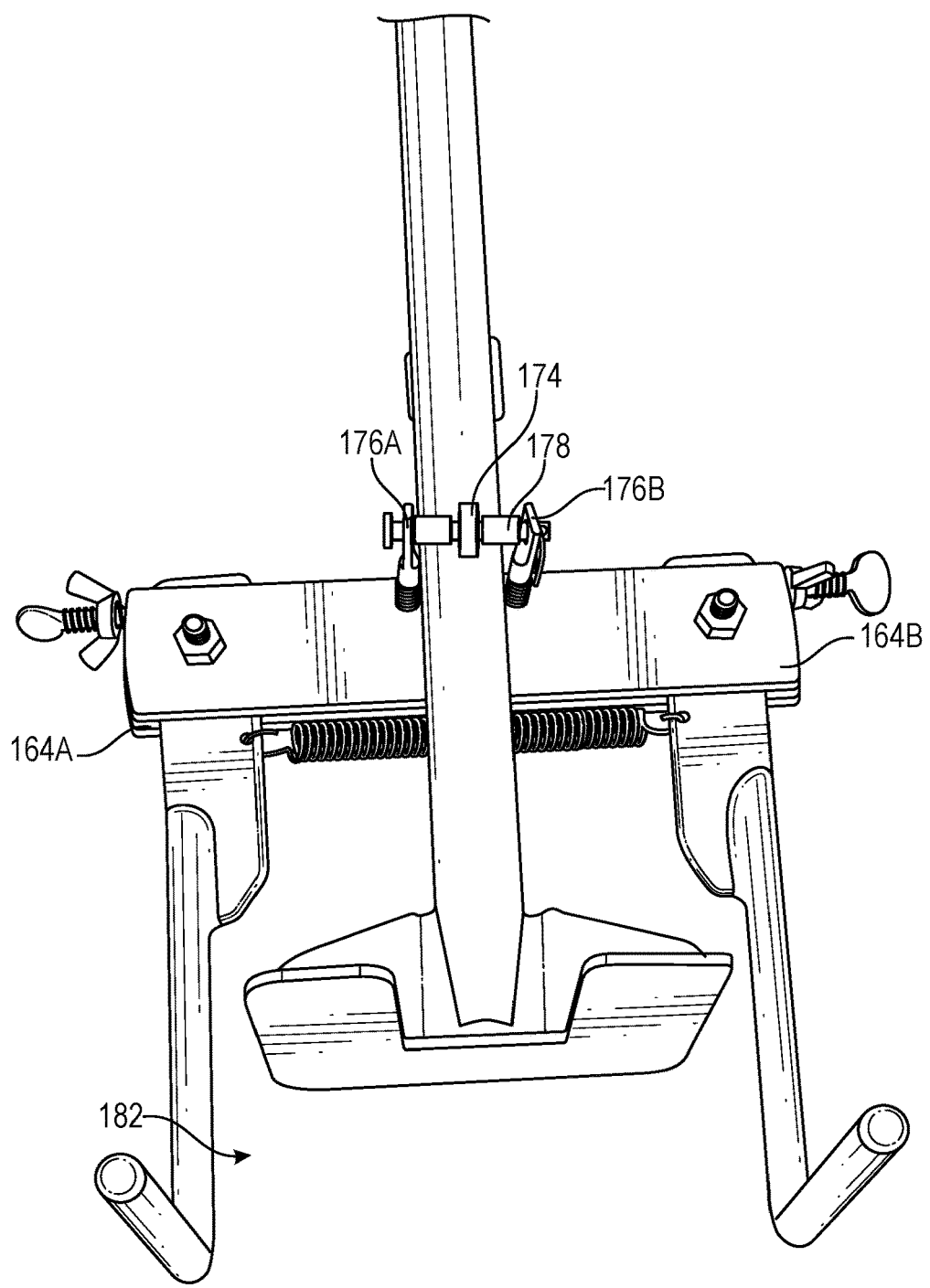
FIG. 7 illustrates a bottom perspective view of a head assembly of a trap release apparatus.
Figure 8:
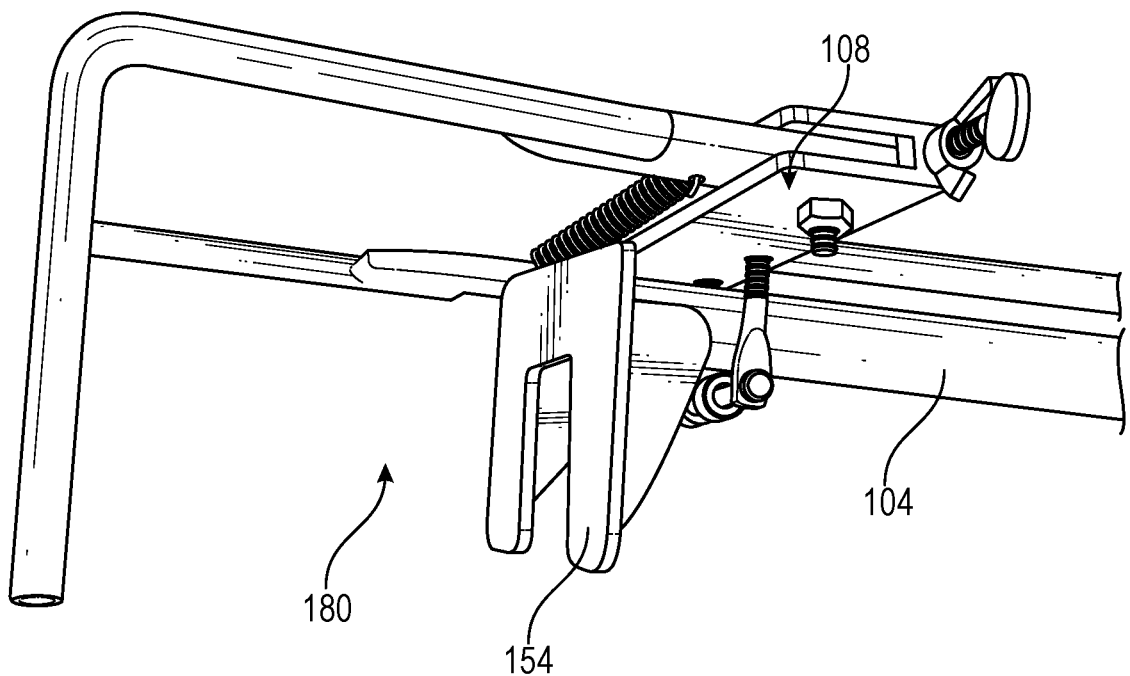
FIG. 8 illustrates a side perspective view of a head assembly of a trap release apparatus.
Figure 9:
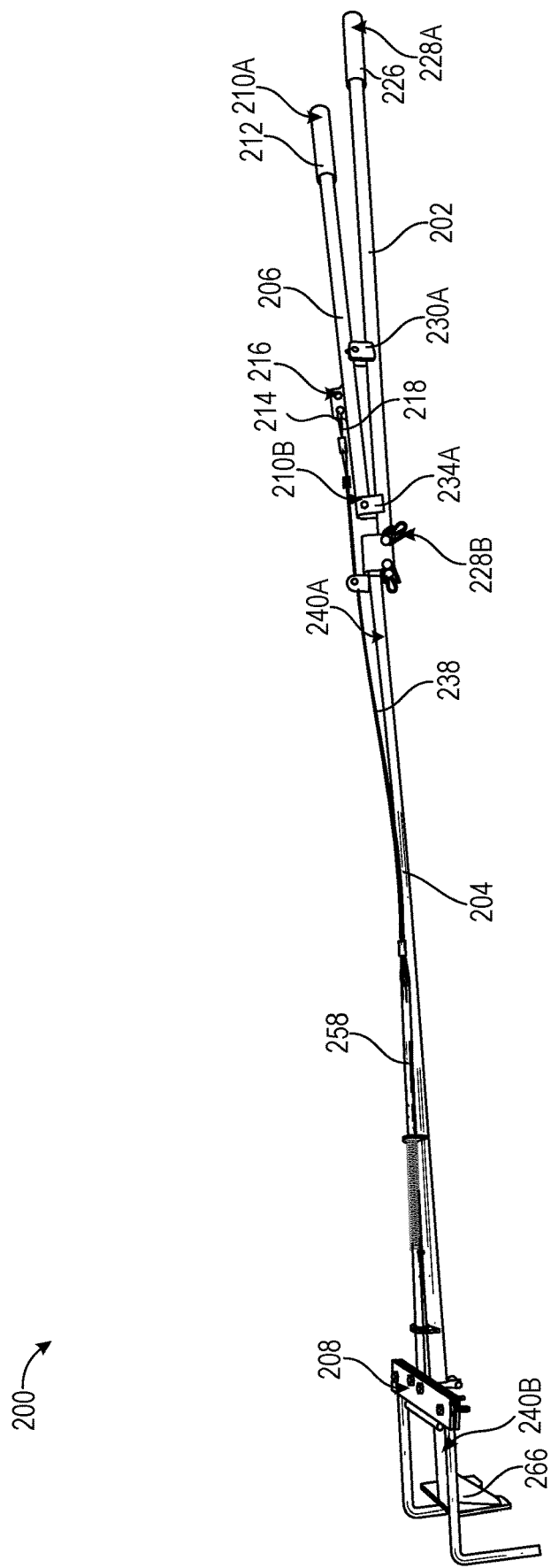
FIG. 9 illustrates a side perspective view of a trap release apparatus.
Figure 10:
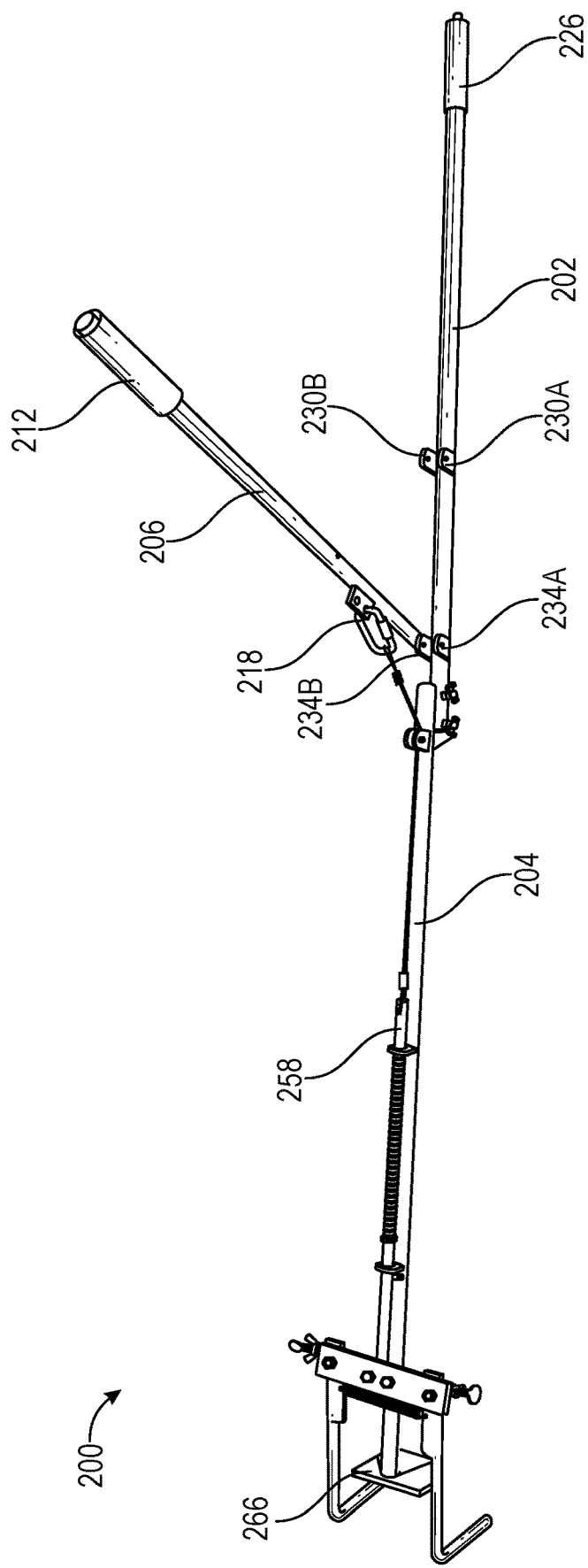
FIG. 10 illustrates a side, top perspective view of a trap release apparatus.
Figure 11:
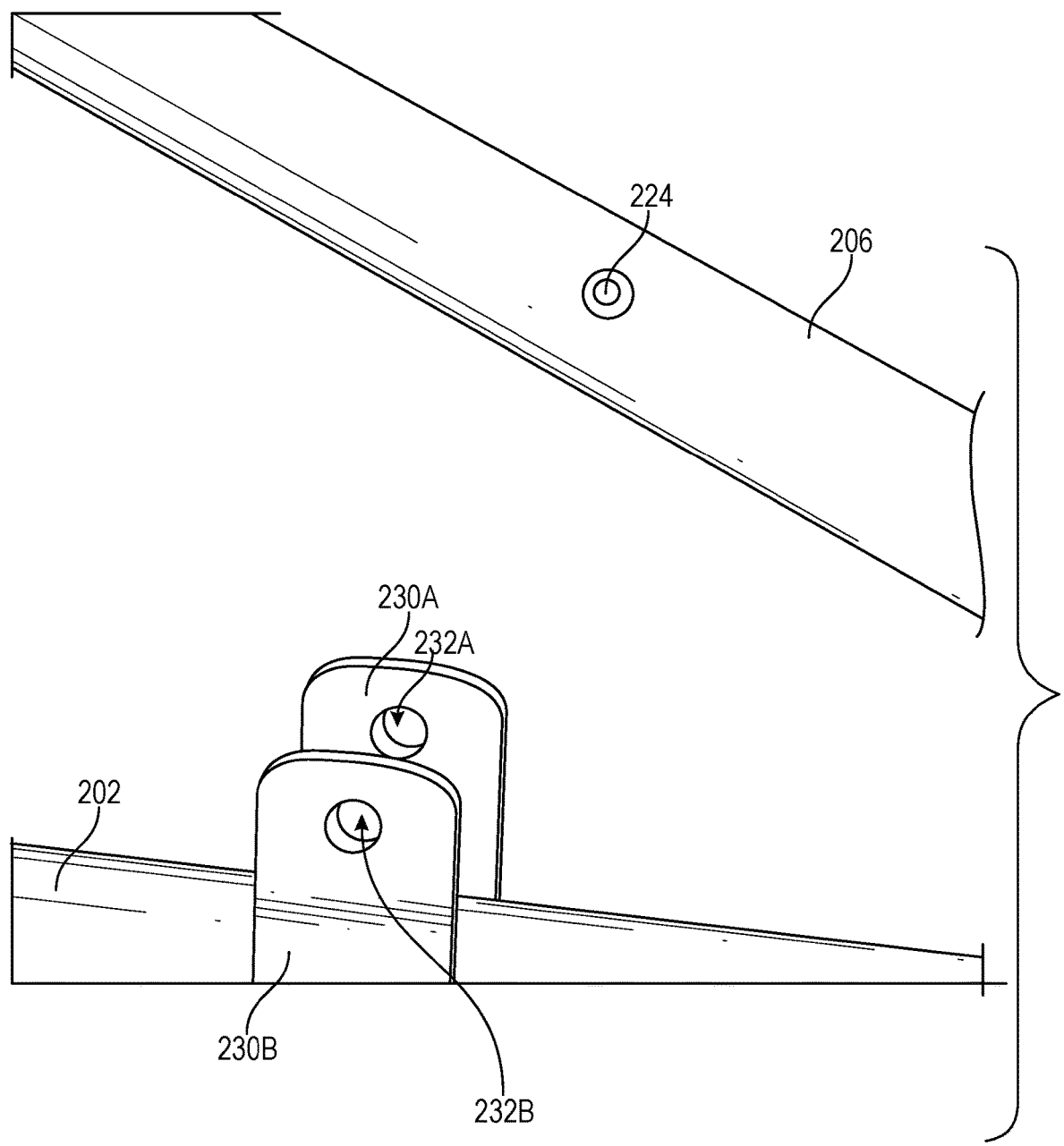
FIG. 11 illustrates a side perspective view of a first shaft and a third shaft of a trap release apparatus.

As shown in FIGS. 7-8, the head assembly 108 may move along the second shaft 104 via a wheel 174 (e.g., bearing), which helps prevent distortion of the head assembly 108 during movement. The wheel 174 may be positioned on a lower surface of the second shaft 104 so as to assist the movement of the head assembly 108. The wheel 174 is held in place via a first fastener 176A (e.g., bolt) and a second fastener 176B (e.g., bolt) coupled to the first and/or second arm plates 164A, 164B with an axle 178 coupled to and interposed between the first and second fasteners 176A, 176B. It will be appreciated that other mechanisms could be envisioned to allow the head assembly to move along the second shafts, such as v-groove track wheels.

In one embodiment, as shown in FIGS. 7-8, a method of using the trap release apparatus 100 comprises actuating the head assembly 108 via the third shaft 106 (e.g., lifting up on the third shaft) to move the trap release apparatus 100 to a first position 180 (e.g., head assembly with first and second arms in an extended position away from the trap panel); placing the trap panel against the bottom of a trap with the first and second arms over the springs of the trap, while the trap is in a closed position; actuating the third shaft (e.g., moving it to a position where it is parallel with the first shaft) so as to move the head assembly to a second position 182 (e.g., head assembly with the first and second arms in a retracted position, moved towards the trap panel), thereby depressing the springs of the trap and moving the trap to an open position, releasing the non-targeted animal.

As shown in FIGS. 9-12, in one embodiment, a trap apparatus 200 comprises a first shaft 202 and a second shaft 204 removably attachable to each other, a third shaft 206 hingedly coupled to the first shaft 202, and a head assembly 208 coupled to the second shaft 204. While the trap apparatus 200 is shown having two shafts that couple together, it will be understood that in some embodiments, the trap apparatus 200 may comprise a single shaft or more than two shafts coupleable together to create a desired length, or may be telescoping. The first, second, and third shafts 202-206 may be manufactured from steel, aluminum, carbon fiber, or any other type of material known in the art. Further, the first, second, and third shafts 202-206 may be cylindrical, square-shaped, etc. The first, second, and third shafts 202-206 may vary in thickness and diameter so as to function with different sizes and spring strengths of foothold traps.

The third shaft 206 may comprise a first end 210A and a second end 210B. The first end 210A may comprise a third shaft handle 212, such as rubber encompassing the first end 210A. At the second end 210B of the third shaft 206, opposite the first end 210A, the third shaft 206 may comprise a panel 214 with one or more panel apertures 216 to receive a fastener 218 (e.g., a quick link), which allow the head assembly 208 to be adjusted to address multiple sizes of foothold trap. In addition, the second end 210B may comprise a third shaft aperture 220 to receive a bolt 222, pin, or other securement mechanism. The third shaft 206 may also comprise spring pins 224 (e.g., bull nose spring pins).

The first shaft 202 may comprise a first shaft handle 226 at a third end 228A that may be manufactured from the same material as the third shaft handle 212, or a different material. The first shaft 202 may comprise a first panel 230A and a second panel 230B. The first and second panels 230A, 230B may each be fastened to a side of the first shaft 202 via welding, or any other fastening mechanism. The first and second panels 230A, 230B may each comprise pin apertures 232A, 232B so as to receive the spring pins 224 on the third shaft 206. Once the spring pins 224 are positioned in the pin apertures 232A, 232B, the third shaft may be secured and parallel to the first shaft 202.

The first shaft 202 may also comprise a third panel 234A with a third panel aperture 236A (FIG. 13) and a fourth panel 234B with a fourth panel aperture 234B that may receive the second end 210B of the third shaft 206 and be hingedly coupled thereto. In particular, the pin 222 may be placed through the third panel aperture 236A, the third shaft aperture 220, and the fourth panel aperture 236B, thereby coupling the third shaft 206 to the first shaft 202.

Referring back to FIG. 9, the panel 214 on the third shaft 206 may receive the loop fastener 218 (e.g., threaded quick link or shackle) and the loop fastener 218 may receive a cable 238 (e.g., a coated or non-coated wire cable or nylon). The cable 238, in some embodiments, may have loops formed at each end thereof using compression sleeves.

Figure 12:
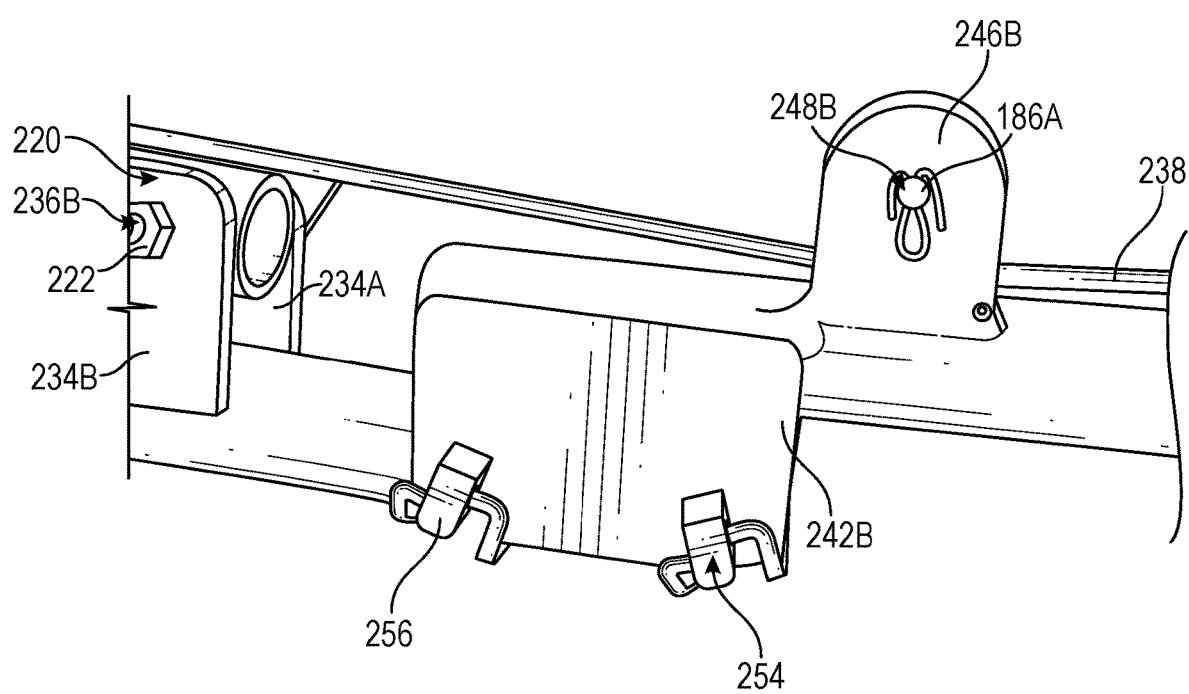
FIG. 12 illustrates a side perspective view of a first shaft and a second shaft of a trap release apparatus.
Figure 13:
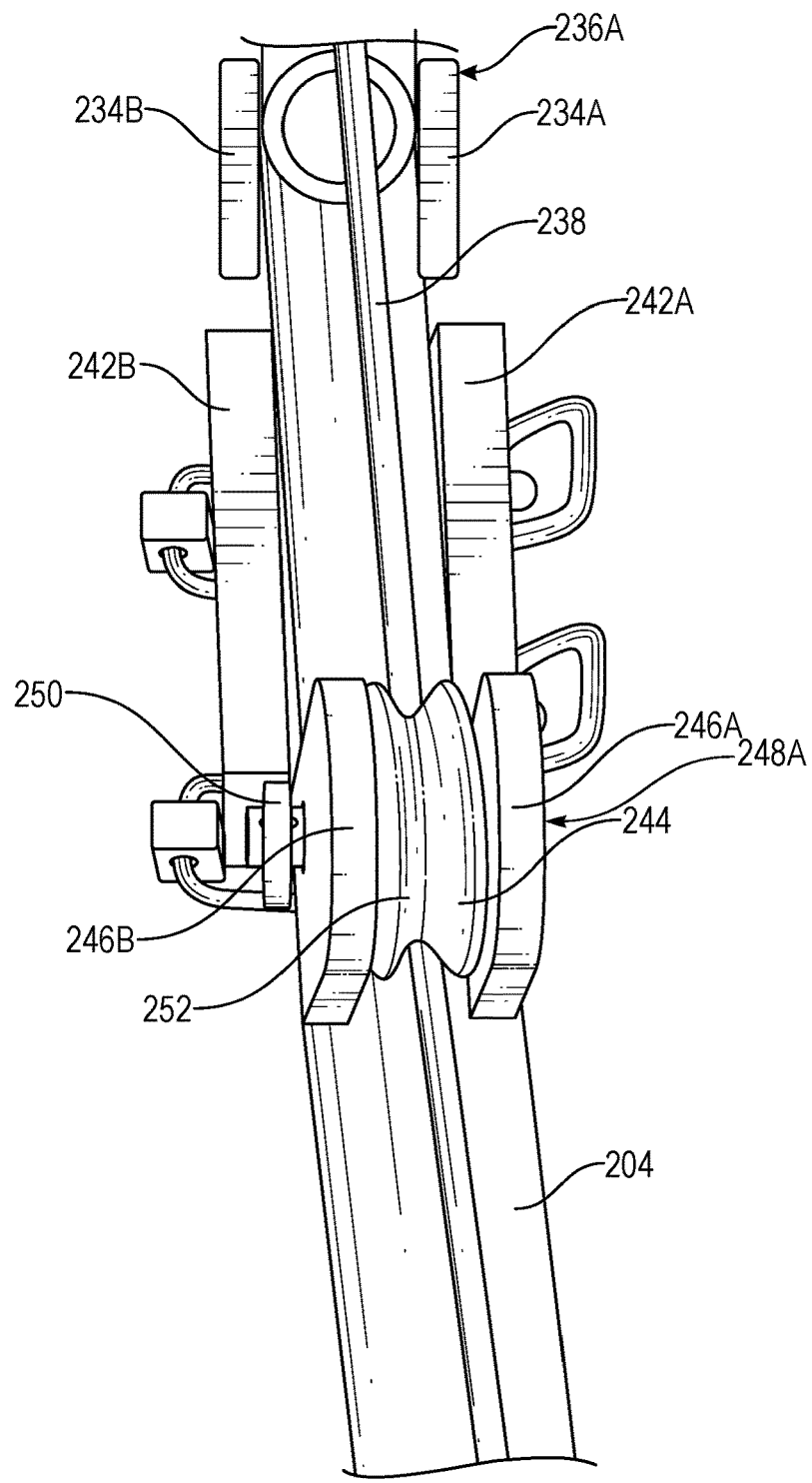
FIG. 13 illustrates a top perspective view of a pulley on a second shaft of a trap release apparatus.
Figure 14:
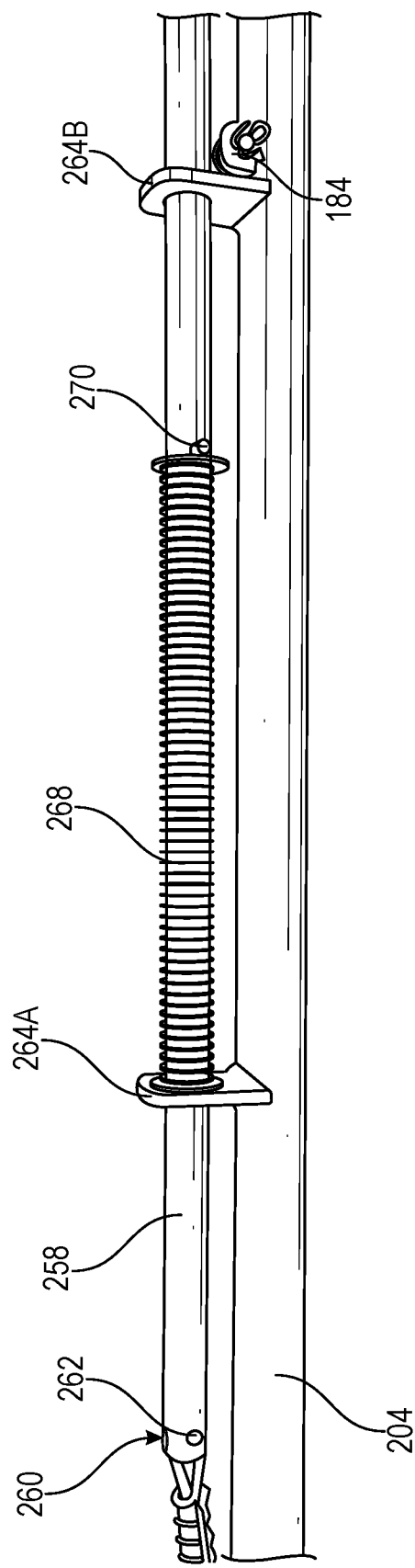
FIG. 14 illustrates a side perspective view of a rod and a second shaft of a trap release apparatus.
Figure 15:
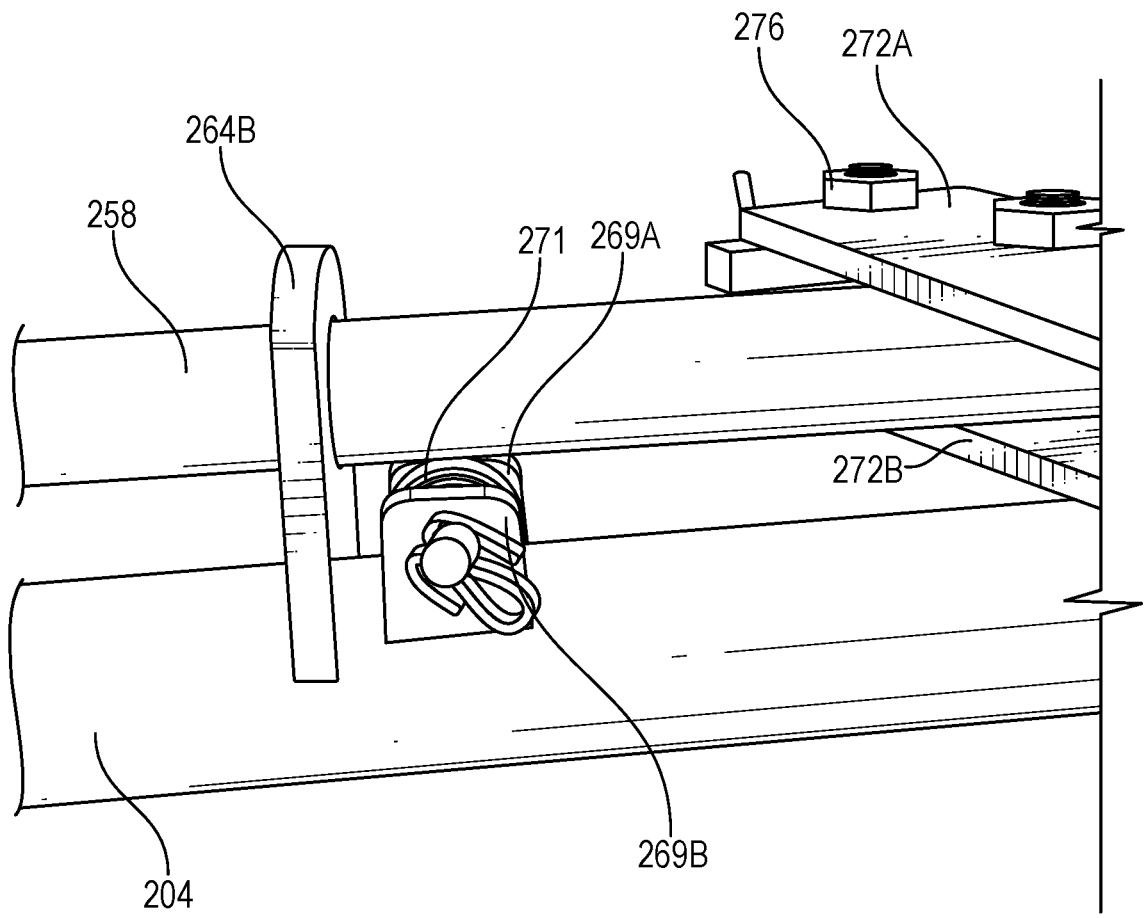
FIG. 15 illustrates a side perspective view of a first bearing on a second shaft of a trap release apparatus.
Figure 16:
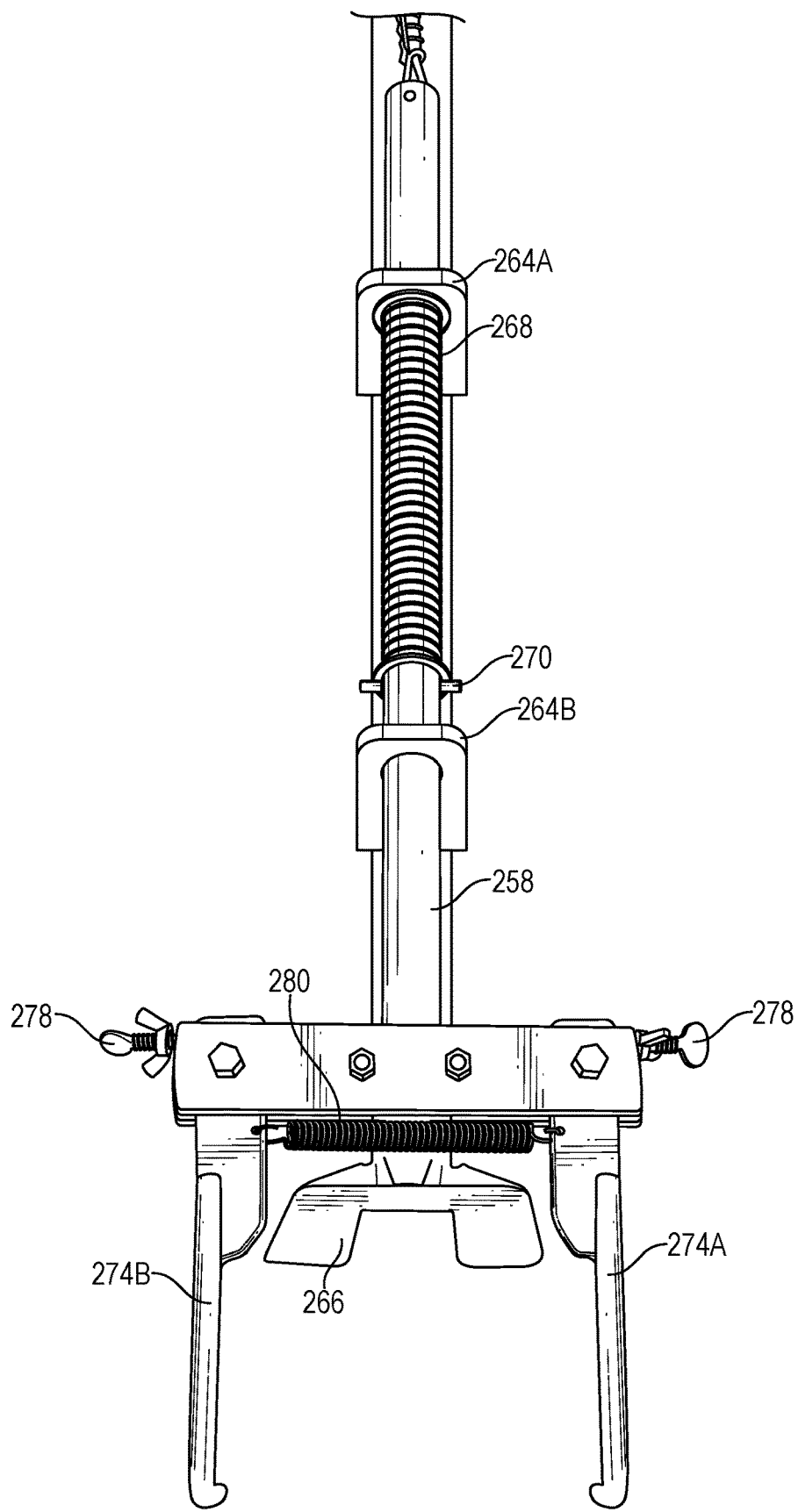
FIG. 16 illustrates a top perspective view of a head assembly of a trap release apparatus.
Figure 17:
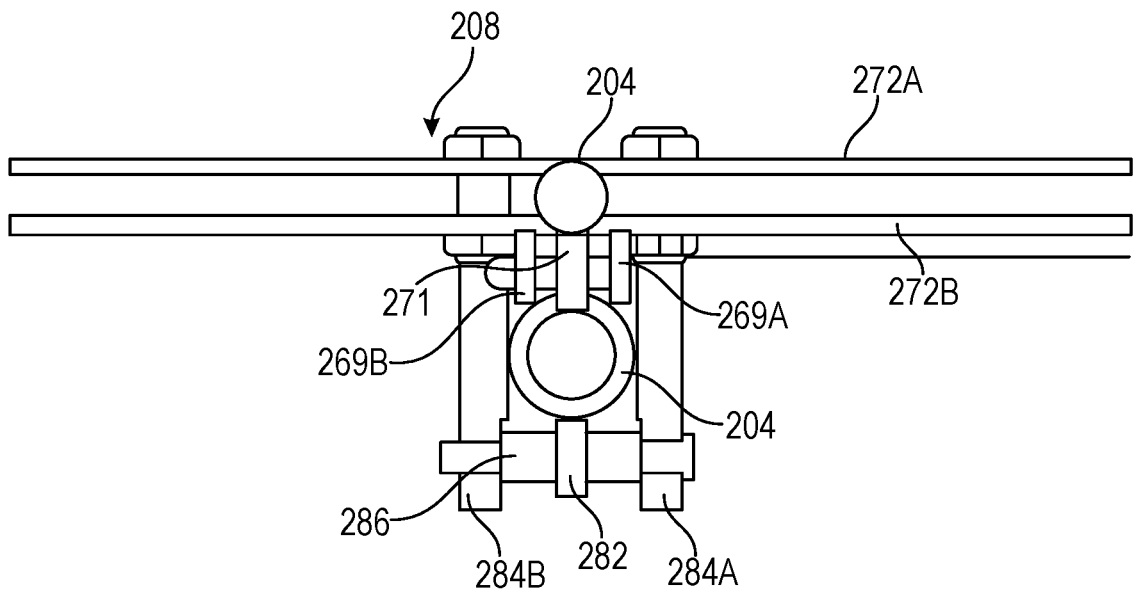
FIG. 17 illustrates a front elevation view of a head assembly of a trap release apparatus.

The first shaft 202 may comprise the third end 228A that is opposite a fourth end 228B. The fourth end 228B may comprise a first aperture and a second aperture. The second shaft 204 may comprise a fifth end 240A and a sixth end 240B, the sixth end 240B being opposite the fifth end 240A. As shown in FIGS. 12-13, the fifth end 240A may comprise a fifth panel 242A, a sixth panel 242B, and a guide 244 (e.g., a metal loop or pulley). The guide 244 may comprise a first protrusion 246A with a first protrusion aperture 248A and a second protrusion 246B with a second protrusion aperture 248B. The first and second protrusion apertures 248A, 248B may receive a pulley axle 250 that has a pulley wheel 252 thereon. The fifth and sixth panels 242A, 242B may each be coupled to the fifth end 240A. The fifth and sixth panels 242A, 242B may, in some embodiments, be square shaped. The fifth and sixth panels 242A, 242B may each comprise one or more panel apertures 254. The panel apertures 254 may align with the first and second apertures on the first shaft 202 so as to receive second pins 256, thereby securing the first shaft 202 to the second shaft 204. The fifth and sixth panels 242A, 242B may extend downward. As such, a lower surface of the second shaft 204 rests on an upper surface of the first shaft 202 when secured.

As shown in FIGS. 14-17, the cable 238 may extend from the guide 244 to a rod 258. In particular, a first rod end may comprise a channel 260 and a pin 262 that receive the cable 238. The second shaft 204 may further comprise a first rod guide 264A and a second rod guide 264B. The sixth end 240B may comprise a trap panel 266 that may be perpendicular to the second shaft 204 and the sixth end 240B. The rod 258 may pass through the first rod guide 264A and a second rod guide 264B.

A first spring 268 (e.g., compression or extension spring) may be positioned on the rod 258 and be positioned between the first rod guide 264A and the second rod guide 264B. The spring 268 may be positioned against the first rod guide 264A and be secured in position via a pin 270. It will be appreciated that, in some embodiments, there may be more or less rod guides than shown. In addition, in some embodiments, the positioning of the spring may be moved to different locations without departing from the apparatus 200 described herein. The second shaft 204 may further comprise a first bearing panel 269A and a second bearing panel 269B. A first wheel 271 (e.g., bearing) may be interposed between the first and second bearing panels 269A, 269B. The first wheel 271 may assist with movement of the rod 258 as the rod 258 may be supported by the first wheel 271. It will be appreciated that the first wheel 271 may allow the rod 258 to be built of heavier material so as to be used with foothold traps including the stiffest springs.

Positioned on a second end of the rod 258, is a first and second arm plate 272A, 272B. The first and second arm plates 272A, 272B may be perpendicular to the second end of the rod 258. A first arm and a second arm 274A, 274B may be interposed between the first and second arm plates 272A, 272B. The first and second arms 274A, 274B may be manufactured out of steel, aluminum, or other materials. In addition, in some embodiments, the first and second arms 274A, 274B may be manufactured out of cable, rope, or any other material or mechanism capable of pulling spring levers down. The first and second arms 274A, 274B may be coupled to the first arm plate and second arm plate 272A, 272B via fasteners 276 and may be pivotally coupled to the arm plates 272A, 272B, thereby allowing the first and second arms 274A, 274B to pivot inwardly or outwardly. Each side of the first and second arm plates 272A, 272B may comprise apertures to receive adjustment fasteners 278 (e.g., receive bolts and wing nuts or any other type of securing and adjustment mechanism). The adjustment fasteners 278, when screwed toward the first and second arms 274A, 274B, may pivot the first and second arms 274A, 274B outwardly so as to adjust to different sizes of footholds. If the adjustment fasteners 278 are moved away from the first and second arms 274A, 274B, the arms may then pivot inwardly to adjust for smaller sized foothold traps. The first and second arms 274A, 274B may be coupled together via an arm spring 280 so as to allow minor adjustments of the arms when placed on a foothold trap and to keep the arms in position. In some embodiments, a single arm may be utilized to compress a spring on a foothold trap. The first and second arms 274A, 274B may extend from the first and second arm plates 272A, 272B for a first distance and then extend downward a second distance at a 90-degree angle from the first and second arm plates 272A, 272B. While a 90-degree angle is shown for the first and second arms 274A, 274B, it will be understood the arms may be configured in numerous shapes and angles.

The head assembly 208 may move along the second shaft 204 via a second wheel 282 (e.g., bearing), which helps prevent distortion of the head assembly 208 during movement. The wheel 282 may be positioned on a lower surface of the second shaft 204 so as to assist the movement of the head assembly 208. The wheel 282 is held in place via a first fastener 284A (e.g., bolt) and a second fastener 284B (e.g., bolt) coupled to the first and/or second arm plates 272A, 272B with an axle 286 coupled to and interposed between the first and second fasteners 284A, 284B. It will be appreciated that other mechanisms could be envisioned to allow the head assembly to move along the second shaft 204.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A trap release apparatus comprising:
a first shaft;
a second shaft removably attachable to the first shaft;
a third shaft hingedly coupled to the first shaft, the third shaft comprising a first end and a second end;
a cable coupled to the third shaft;
a rod coupled to the second shaft and the cable;
a head assembly coupled to the rod;
wherein when the head assembly is positioned on a foothold trap and the third arm is actuated, the head assembly compresses springs on the foothold trap, opening the foothold trap and releasing a non-targeted animal.

2. The trap release apparatus of claim 1, wherein the second end of the third shaft comprises a panel that receives a loop fastener.

3. The trap release apparatus of claim 2, wherein the loop fastener receives the cable.

4. The trap release apparatus of claim 1, wherein the first end of the third shaft comprises a third shaft handle.

5. The trap release apparatus of claim 1, wherein the first shaft comprises a first panel and a second panel that receive and secure the third shaft.

6. The trap release apparatus of claim 1, wherein the first shaft comprises a third panel and a fourth panel that receive the second end of the third shaft.

7. The trap release apparatus of claim 6, wherein the third shaft is hingedly coupled to the third panel and fourth panel via a pin.

8. The trap release apparatus of claim 1, wherein the first shaft comprises a first shaft handle.

9. The trap release apparatus of claim 1, wherein the first shaft comprises a third end opposite a fourth end, the third end being releasably attachable to the second shaft.

10. The trap release apparatus of claim 1, wherein the head assembly comprises a first arm plate and a second arm plate with a first arm and a second arm being coupled to and positioned between the first arm plate and second arm plate.

11. The trap release apparatus of claim 1, wherein the second shaft comprises a fifth end opposite a sixth end.

12. The trap release apparatus of claim 11, wherein the fifth end comprises a fifth panel, a sixth panel, and a guide that receives the cable.

13. The trap release apparatus of claim 11, wherein the sixth end comprises a trap panel that is placed against a base of the foothold trap.

14. The trap release apparatus of claim 1, wherein the second shaft comprises one or more rod guides.

15. The trap release apparatus of claim 14, wherein the one or more rod guides receive the rod.

16. A trap release apparatus comprising:
a first shaft;
a second shaft removably attachable to the first shaft;
a third shaft hingedly coupled to the first shaft, the third shaft comprising a first end and a second end, the second end comprising a loop fastener;
a cable coupled to the loop fastener;
a head assembly actuated by the third shaft via the cable, the head assembly comprising:
a first arm plate and a second arm plate,
a first arm and a second arm coupled to the first arm plate and the second arm plate;
wherein the head assembly is positioned on a foothold trap with the first arm and the second arm placed over springs of the foothold trap, the third shaft is actuated to pull the springs down, releasing a non-targeted animal.

17. The trap release apparatus of claim 16, wherein the first arm and the second arm are interposed between and pivotally coupled to the first arm plate and the second arm plate.

18. The trap release apparatus of claim 16, further comprising an arm spring coupled to and positioned between the first arm and the second arm.

19. The trap release apparatus of claim 16, wherein the head assembly moves along a lower surface of the second shaft via a wheel.

20. A trap release apparatus comprising:
a first shaft comprising:
a first panel and a second panel, and
a third panel and a fourth panel;
a second shaft removably attachable to the first shaft;
a third shaft hingedly coupled to the first shaft via the third panel and the fourth panel, the third shaft comprising a first end and a second end, the second end comprising a panel to receive a loop fastener;
a cable coupled to the loop fastener;
a rod coupled to the second shaft and the cable;
a head assembly coupled to the rod, the head assembly comprising:
  a first arm plate and a second arm plate,
  a first arm and a second arm coupled to the first arm plate and the second arm plate;
wherein when the head assembly is positioned on a foothold trap and the third arm is actuated, the head assembly compresses springs on the foothold trap, opening the foothold trap and releasing a non-targeted animal.

* * * * *